3,711,374
PROCESS FOR PRODUCING L-LYSINE BY
FERMENTATION IN THE PRESENCE OF
HYDROCARBONS
Katsunobu Tanaka and Kazuo Kimura, Machida-shi,
Japan, assignors to Kyowa Hakko Kogyo Co., Ltd.,
Tokyo, Japan
No Drawing. Continuation-in-part of aplication Ser. No.
574,526, Aug. 24, 1966. This application July 15, 1968,
Ser. No. 744,698
Claims priority, application Japan, Mar. 18, 1969,
44/55,376
Int. Cl. C12d 13/06
U.S. Cl. 195—28 R     6 Claims

ABSTRACT OF THE DISCLOSURE

A process for producing L-lysine by fermentation. The process is conducted by culturing a microorganism capable of producing L-lysine. The microorganism is a mutant strain which requires homoserine or both threonine and methionine for its growth. The culturing is effected under aerobic conditions in an aqueous nutrient medium containing at least one hydrocarbon as the major source of carbon.

CROSS-REFERENCE TO RELATED APPLICATION

This application is a continuation-in-part of copending application Ser. No. 574,526 filed on Aug. 24, 1966, which application is now abandoned.

This invention relates to a process for producing L-lysine. More particularly, it relates to a process for the production of L-lysine by fermentation. Even more particularly, the invention relates to a process for the production of L-lysine by fermentation with microorganisms in the presence of hydrocarbons.

The present inventors have previously found numerous novel strains belonging to the genera Brevibacterium, Micrococcus, Arthrobacter and Corynebacterium which have the capability of producing large amounts of L-glutamic acid from hydrocarbons as the main carbon source in a fermentation process. Such microorganisms also accumulate alpha-keto-glutaric acid in the culture medium. See, for example, application Ser. No. 478,725, filed Aug. 10, 1965 and Ser. No. 481,921, filed Aug. 23, 1965.

It has also been found that various mutant strains having particular nutrition requirements may be obtained by treating these parent strain bacteria with ultraviolet irradiation, chemical agents and the like.

L-lysine, 2,6-diaminohexanoic acid, is an amino acid well known in the art. It has been used in the area of food enrichment, whereby the supplementation of wheat-based foods with lysine improves their protein quality and results in an improved growth and tissue synthesis. This compound has also been used medically as a nutrient. Thus, it would be most advantageous to have available a process for the production thereof which may be carried out economically on an industrial scale.

One of the objects of the present invention is to provide an improved process for the production of L-lysine which overcomes some of the disadvantages and deficiences of the prior art methods.

Another object of the present invention is to provide a process for producing L-lysine by fermentation which may be carried out in an efficacious and simple manner.

A further object of the invention is to provide a process for producing L-lysine by fermentation which gives the product in high purity and good yield.

A still further object of the invention is to provide a process for producing L-lysine by fermentation which may be carried out advantageously on an industrial scale at low cost to give a high yield of product.

These and other objects and advantages of the present invention will become apparent to those skilled in the art from a consideration of the following specification and claims.

In accordance with the present invention, it has been found that remarkably large quantities of L-lysine are accumulated in the fermentation liquor if the fermentation or culturing is carried out with mutant strains which require either homoserine or threonine and methionine for their growth in a culture medium containing at least one hydrocarbon.

Mutant strains of microorganisms which require either homoserine or threonine and methionine for their growth, such as those of *Micrococcus glutamicus* and the like, are capable of producing large amounts of L-lysine from carbohydrates. In the present invention, it has been recognized that the relationship between the nutrition requirement and the accumulation of L-lysine from hydrocarbons in a fermentation process using the foregoing hydrocarbon-assimilating bacteria is almost similar to that noted above with respect to microorganisms which produce L-lysine from carbohydrates.

Of particular advantage in the present invention are microorganisms which are capable of producing large amounts of L-lysine. These include, for example, the mutant strains of *Brevibacterium ketoglutamicum*, *Arthrobacter paraffineus* and *Corynebacterium hydrocarboclastus* which require homoserine for their growth. The taxonomical descriptions of the parent strains from which these mutants were obtained are given in application Ser. No. 470,883. By using such strains, the carbohydrates employed in the conventional fermentation processes for the production of L-lysine may be substituted for by hydrocarbons, which are readily available at low cost in large quantities. Moreover, the L-lysine may be more easily separated from the fermentation liquor after the completion of fermentation.

Either a synthetic or a natural culture medium may be employed for the growth and fermentation of the microorganisms as long as it contains the essential nutrients for the growth of the particular microorganism employed. In particular, the culture medium should contain at least one nitrogen source, inorganic salt and a small amount of the microorganism's particular nutrition-requiring substance as well as at least one hydrocarbon as the main carbon source.

As the hydrocarbon source to be employed in culturing the microorganisms in accordance with the present invention, n-paraffins having from 10 to 30 carbon atoms are preferred. A single n-paraffin or a mixture of more than one of these n-paraffins, or a mixture of one or more than one of these n-paraffins with another carbon source wherein the n-paraffin is the major constituent, may be used. Normal-paraffins within the abovementioned carbon number range include n-dodecane, n-tridecane, n-tetradecane, n-pentadecane, n-hexadecane, n-heptadecane and n-octadecane and mixtures thereof.

The other details of culturing are conventional and well known to those skilled in the art. For example, other carbon sources which may be utilized in minor amount include organic acids, for example, acetic acid or its salts, carbohydrates, such as glucose, starch hydrolysate, molasses, etc., or other conventional carbon sources. Inorganic salts which may be employed include potassium phosphate, magnesium sulfate, manganese sulfate, potassium chloride, ferrous sulfate, calcium carbonate, etc. Conventional sources of nitrogen which may be employed include organic nitrogen sources such as cornsteep liquor, meat extract, yeast extract, peptone, fish meal and the like as well as inorganic nitrogen sources such as ammonium salts, for example, ammonium sulfate, ammonium nitrate, ammonium chloride, ammonium carbonate and the like and/or urea.

The n-paraffin may be added to the fermentation medium in the amount of from about 1% to 30% by weight.

The fermentation is carried out under aerobic conditions, such as aerobic shaking of the culture or with stirring of a submerged culture, at a temperature of from about 20° to 40° C. and at a pH of from about 4.0 to 9.0.

After completion of the fermentation process, the L-lysine is recovered from the fermentation liquor by conventional methods, such as ion exchange resin treatment, extraction with solvents, centrifugation and chromatography.

The following example is given merely as illustrative of the present invention and is not to be considered as limiting. Unless otherwise indicated, the percentages set forth therein are by weight.

The filtrate obtained by the removal of the cell bodies by centrifugal separation is passed through a weakly basic ion exchange resin, the pH of the filtrate having been previously adjusted to 7.0 with 0.5 M buffer solution. The resin column is washed with water and eluted with 0.15 N ammonia water. The fractions which are ninhydrin reaction positive are gathered together, and the small amount of ammonia contained therein removed by means of aeration. The pH of the thus obtained solution is adjusted to 2.0 with 6 N HCl and concentrated to dryness under reduced pressure.

As a result of this treatment, crude crystals of L-lysine hydrochloride are obtained by dissolving the thus obtained substance in a small amount of water and adding alcohol thereto. Crude crystals of L-lysine hydrochloride are obtained by adding ether to the mother liquor of the crystals. The amount of L-lysine hydrochloride crystals recovered is shown in the fourth column of Table 1.

TABLE I

| Parent strain | Employed strain | Nutrition-requiring substance | Amount of L-lysine accumulated (mg./ml.) | Amount of L-lysine hydrochloride recovered from 500 ml. of the culture medium (grams) |
| --- | --- | --- | --- | --- |
| Arthrobacter paraffineus, No. 2411, ATCC 15591 | ATCC (21003) | Homoserine | 10.0 | 4.6 |
| Brevibacterium ketoglutamicum, No. 2439, ATCC 15587 | ATCC (21004) | Methionine and threonine. | 4.0 | 1.1 |
| Corynebacterium hydrocarboclastus, No. 2438, ATCC 15592 | ATCC (21131) | do | 4.0 | 1.6 |

EXAMPLE

The homoserine-requiring strain (ATCC 21003) of *Arthrobacter paraffineus* No. 2411 ATCC 15591, the methionine and threonine requiring strain (ATCC 21004) of *Brovibacterium ketoglutamicum* No. 2439 ATCC 15587, and the methionine and threonine requiring strain (ATCC 21131) of *Corynebacterium hydrocarboclastus* No. 2438 ATCC 15592 are inoculated into 10 ml. of yeast-bouillon seed culture media contained in large-sized test tubes, respectively. The seed culture medium contains 1% of yeast extract, 1% of meat extract, 1% peptone and 0.2% of NaCl. The seed cultures are then cultivated with aerobic shaking at 200 r.p.m. at 30° C. for 24 hours.

Ten percent portions by volume of the various seed media are inoculated into 50 ml. portions of the fermentation medium described below except for the variations noted below, contained in 500 ml. Sakaguchi flasks. The fermentation medium consists of 10% (v./v.) of an equivolume mixture of n-paraffine having from 12 to 18 carbon atoms (from n-dodecane through n-octadecane) as well as the following components:

0.1% KH$_2$PO$_4$
0.1% K$_2$HPO$_4$
0.1% MgSO$_4$·7H$_2$O
0.002% MnSO$_4$·4H$_2$O
0.02% FeSO$_4$·7H$_2$O
100 γ/l. thiamine hydrochloride
100 γ/ml. L-homoserine
2.0% (NH$_4$)$_2$SO$_4$ The pH of the fermentation medium is 6.5. In the case of the media containing the homoserine requiring strains, 100 γ/ml. of L-homoserine and, in the case of the methionine and threonine requiring strains, 200 γ/ml. of DL-methionine and 100 γ/ml. of L-threonine are added to the flasks containing the fermentation media. Culturing is then carried out with aerobic shaking of the cultures at 30° C. with 110 returns per minute.

The amount of L-lysine accumulated in the various fermentation media is shown in Table 1. The L-lysine is recovered from the fermentation liquor after the completion of fermentation as follows.

The invention being thus described, it will be obvious that the same may be varied in many ways. Such variations are not to be regarded as a departure from the spirit and scope of the invention, and all such modifications as would be obvious to one skilled in the art are intended to be included herein.

We claim:

1. A process for producing L-lysine which comprises culturing a microorganism capable of producing L-lysine, said microorganism being a mutant strain of *Brevibacterium ketoglutamicum* which requires homoserine or both threonine and methionine for its growth, under aerobic conditions in an aqueous nutrient medium containing at least one n-paraffin containing at least 10 to 30 carbon atoms as the major source of carbon and recovering the L-lysine thus produced.

2. A process for producing L-lysine which comprises culturing a microorganism capable of producing L-lysine, said microorganism being a mutant strain of *Arthrobacter paraffineus* which requires homoserine or both threonine and methionine for its growth, under aerobic conditions in an aqueous nutrient medium containing at least one n-paraffin containing from 10 to 30 carbon atoms as the major source of carbon and recovering the L-lysine thus produced.

3. A process for producing L-lysine which comprises culturing a microorganism capable of producing L-lysine, said microorganism being a mutant strain of *Corynebacterium hydrocarboclastus* which requires homoserine or both threonine and methionine for its growth, under aerobic conditions in an aqueous nutrient medium containing at least one n-paraffin containing from 10 to 30 carbon atoms as the major source of carbon and recovering the L-lysine thus produced.

4. A process for producing L-lysine which comprises culturing *Brevibacterium ketoglutamicum* ATCC 21004 under aerobic conditions in an aqueous nutrient medium containing at least one hydrocarbon as the major source of carbon and recovering the L-lysine thus produced.

5. A process for producing L-lysine which comprises culturing *Arthrobacter paraffineus* ATCC 21003 under aerobic conditions in an aqueous nutrient medium containing at least one hydrocarbon as the major source of carbon and recovering the L-lysine thus produced.

6. A process for producing L-lysine which comprises culturing *Corynebacterium hydrocarboclastus* ATCC 21131 under aerobic conditions in an aqueous nutrient medium containing at least one hydrocarbon as the major source of carbon and recovering the L-lysine thus produced.

References Cited
UNITED STATES PATENTS

| | | | |
|---|---|---|---|
| 2,979,439 | 4/1961 | Kinoshita et al. | 195—47 |
| 3,222,258 | 12/1965 | Iizuka et al. | 195—29 |

LIONEL M. SHAPIRO, Primary Examiner